United States Patent
Day et al.

(10) Patent No.: US 7,653,826 B1
(45) Date of Patent: Jan. 26, 2010

(54) METHOD AND APPARATUS FOR QUERY OPTIMIZATION AND MANAGEMENT OF SLEEPY DRIVES

(75) Inventors: Paul Reuben Day, Rochester, MN (US); Randy L. Egan, Rochester, MN (US); Roger Alan Mittelstadt, Byron, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/356,434

(22) Filed: Jan. 20, 2009

(51) Int. Cl.
*G06F 1/32* (2006.01)

(52) U.S. Cl. ...................... 713/324; 713/320

(58) Field of Classification Search .............. 713/320, 713/323, 324
See application file for complete search history.

(56) References Cited

U.S. PATENT DOCUMENTS

| | | | |
|---|---|---|---|
| 5,784,628 A | | 7/1998 | Reneris |
| 5,900,007 A | * | 5/1999 | Nunnelley et al. .............. 711/4 |
| 5,996,083 A | | 11/1999 | Gupta et al. |
| 6,717,763 B2 | | 4/2004 | Ottesen et al. |
| 6,986,066 B2 | | 1/2006 | Morrow et al. |
| 7,428,622 B2 | * | 9/2008 | Tulyani .................... 711/161 |
| 7,533,230 B2 | * | 5/2009 | Glover et al. .............. 711/165 |
| 2006/0143419 A1 | * | 6/2006 | Tulyani .................... 711/165 |
| 2008/0183671 A1 | * | 7/2008 | Chaves ....................... 707/3 |
| 2009/0043748 A1 | * | 2/2009 | Maghoul et al. .............. 707/5 |
| 2009/0043749 A1 | * | 2/2009 | Garg et al. ................... 707/5 |

FOREIGN PATENT DOCUMENTS

EP 1950671 1/2004

OTHER PUBLICATIONS

"The Dream of the Sleepy Drives", downloaded from http://www.cbronline.com/news/the_dream_of_the_sleepy_drive; 3 pages, Jan. 20, 2009.

* cited by examiner

*Primary Examiner*—Chun Cao

(57) ABSTRACT

The invention, in an embodiment, relates to optimizing database performance by taking advantage of sleepy drives. The invention analyzes queries to indexes based on usage frequency, and determines whether to access an index stored on a sleepy drive, or perform an alternate access plan based on green optimization. Furthermore, the invention transfers data, such as, for example, indexes, files, data areas, journals, and statistics, between active and sleepy drives based on usage frequency. In another embodiment, the invention provides an improved sleepy drive which optimizes energy savings by a graduated degree based on a speed setting. In yet another embodiment, the invention controls when read-write heads are unloaded from disks to reduce drag and power consumption by a disk drive.

1 Claim, 7 Drawing Sheets

METHOD AND APPARATUS FOR QUERY OPTIMIZATION AND MANAGEMENT OF SLEEPY DRIVES

BACKGROUND

1. Field of the Invention

The inventive embodiment provides a method and apparatus for optimizing the power consumption of computer drives, and in particular, optimizing the power consumption of sleepy, or green, computer drives.

2. Description of Related Art

Recent emphasis on the environment and energy conservation has prompted the computer industry to produce computers that have reduced environmental impact, such as green computers. A conventionally defined green computer is a computer that has reduced power consumption.

The computer disk drive industry is currently developing "sleepy" drives. Sleepy drives are disk drives that are designed to save power when not in active use by spinning down to a slower speed or stopping altogether. The idea behind sleepy drives is to reduce the computer's energy consumption. Sleepy drives are known in the art, however, the problem with the conventional sleepy drive is that it impairs the computer's performance.

Once a sleepy drive is in sleep mode, the lag time required for the sleepy drive to become active makes sleepy drives an unacceptable and inefficient solution for many enterprise databases and applications which require instantaneous or expedient processing.

The hardware to implement sleepy drives is known in the art. However, the software to allow computer systems to intelligently take advantage of sleepy drives without an impact to performance is not currently available. Furthermore, the energy required to activate a sleepy drive from a stopped or reduced speed is significant as compared to the energy required to leaving the drive spinning. Acceleration is power consuming, and therefore, the number of accelerations must be minimized in order for the computer system to be truly green.

Therefore, there is a need for a method and apparatus that takes advantage of sleepy drives, but which significantly reduces the adverse performance that sleepy drives have on enterprise databases and applications while reducing energy consumption.

SUMMARY

In one embodiment, the disclosure relates to a method and apparatus that integrates intelligence into a query optimizer for utilizing sleepy disk drives concurrent with existing optimization techniques to improve green disk drive technology. The query optimizer provides energy savings by optimizing query processing and disk drive access as well as disk drive speed and the control of disk read/write heads. In an embodiment, the disclosure related to a method of reducing the power consumption of a computer device, comprising receiving a plurality of queries from a processor, each query directed to an index stored on one of an active drive or a sleeping drive; generating a log storing a history of the plurality of queries to the index; determining, using the log, if the index is infrequently used, frequently used, or intermittently used; transferring the index from the drive to the active drive when the index is frequently used; transferring the index from the active drive to the sleeping drive when the index is infrequently used; determining a future query request based on the log; and temporarily transferring, in anticipating of the future query request, the index from the sleeping drive to an active drive.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
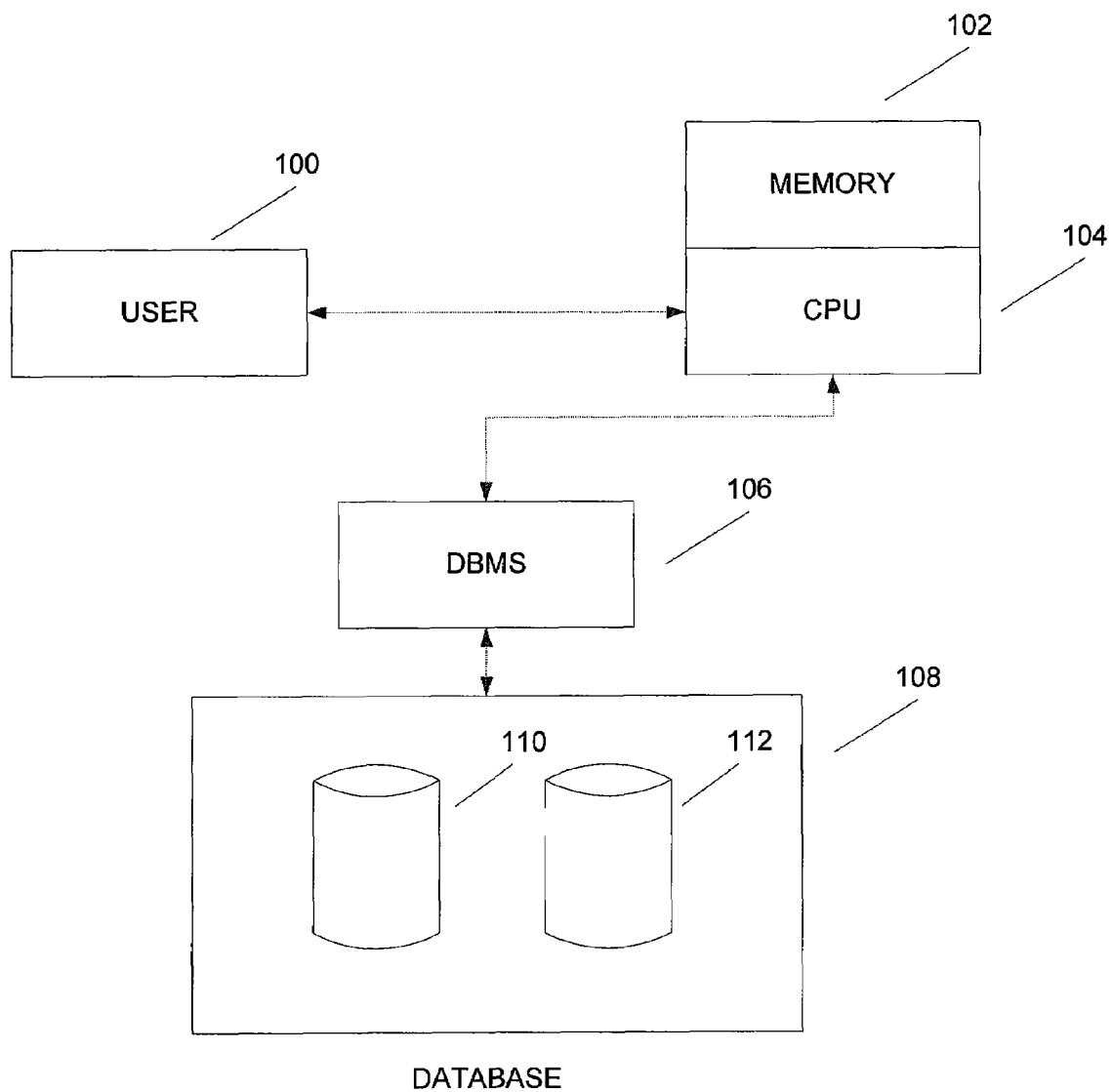
FIG. 1 is a block diagram illustrating the components of a conventional computer system for use in conjunction with the present invention.

FIG. 1 is a block diagram illustrating the components of a conventional computer system for use in conjunction with the present invention. Data management system (DBMS) 106 will normally be loaded into system memory 102, which can be RAM from a disk storage unit, although portions of the DBMS 106 may remain in disk storage when not in use, and execution directly from other storage media (e.g. ROM, EPROM, WORM, DASD) is also feasible. The working data, identifier fields, and hierarchy information are normally stored in and read from system memory 102, but disk storage may also be used. A user 100, which may include a database meta designer, a database programmer, or a database user interacts with DMBS 106 through central processing unit (CPU) 104 via a standard user interface which may include a display, keyboard, mouse, or other input/output device (not shown). CPU 104 or other processor executes instructions from DBMS 106 using data from memory 102 and database 108. Database 108 can include a plurality of storage media, such as disk 110 and disk 112. The disk drives and storage media stored with database 108 can include a plurality of active and sleepy drives.

In an embodiment, DBMS 106 and related software runs on one or more UNIX™-based servers and workstations (not shown). Other types of platforms can also be used. Query logs are preferably cached in system memory 102 on the same CPU 104 as that used to access the DBMS 106 by the user 100. To accommodate large numbers of users and CPUs, a networked query server (not shown) can be utilized between each individual CPU and DBMS 106.

In an embodiment, the present invention integrates intelligence into an optimizer for utilizing sleepy drives in conjunction with active drives. The term sleepy drive refers to sleeping drives, semi-sleeping drives, drives fully at rest, green technology drives, or passive storage media. The term active drives refers to online drives, awake drives, non-sleeping drives, and other conventional storage media.

Figure 2:
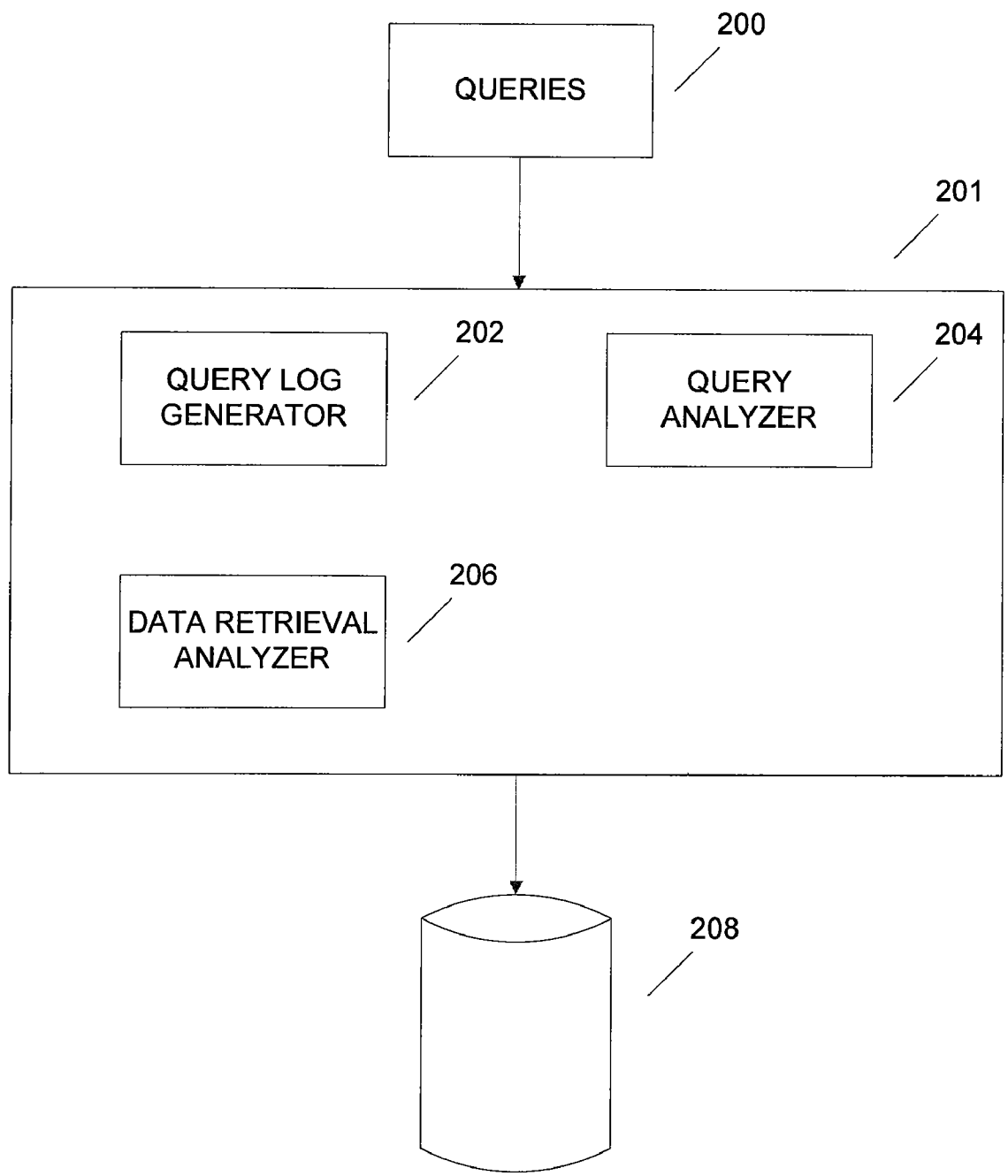
FIG. 2 is a block diagram illustrating the components of the database management system of the present invention.

FIG. 2 is a block diagram illustrating the components of the database management system of the present invention. Database management system (DBMS) 201 includes a query log generator 202, query analyzer 204 and a data retrieval analyzer 206.

Query log generator 202 receives queries 200 from a processor (not shown). The query log generator 202 generates a query log which consists of a sequence of past queries. The query log generator 202 can be configured to generate logs based on the queries from a past time period, such as second, minute, hour, day, week, month, quarter, year, or any other increment of time. For example, in an embodiment, the query log generator 202 generates a log of all queries received within a previous month.

In environments where a large amount of database querying is involved, and where there are numerous active and sleepy drives which constantly transfer data amongst themselves, the query log generator 202 can be configured to generate a log of all queries received within a previous hour. In this way, the query log shows the most recent query activity and can reflect the most recent data accesses and database transfers.

On the other hand, in environments where there is not very much data transfer between drives, and the data remains fairly static, the query log generator 202 can be configured to generate a log of all queries received with the past year. In this way, since the data structure has remained fairly constant, the yearly query log data can reflect the most common type of data accesses.

The query analyzer 204 analyzes the query log generated by the query log generator 202. The query analyzer 204 may be a functional program that analyzes query log information collected in raw query logs to determine the usage of data by users over a given time period within various indexes stored on various disk drives in database 208. The query analyzer 204 analyzes the frequency of data usage or access within database 208, and can determine access patterns which take into account the number of times a database index is accessed, and the time between each such accesses.

Furthermore, the query analyzer 204 can identify the user or CPU that executed the query, as well as the tables and columns queried, and the manner in which the tables and columns were referenced within the query to an index (e.g., part of a result set, used in a JOIN criteria, used for filtering or sorting results, etc.).

In another embodiment, the query analyzer 204 analyzes a sampling of a query log, or an approximation of queries on a specified factor (e.g., data ranges based on time, user, application, or some other factor). In this embodiment, the analysis of queries may yield faster results and still provide desired information regarding the query history, as only a statistical sampling of queries is used instead of an entire set of queries for a specified factor.

The query analyzer 204 determines how frequently an index is accessed. For example, an index can be identified as "infrequently used", "intermittently used", or "frequently used". The thresholds for these three usage categories can be pre-set, or user defined. In an embodiment, the Table 1 below represents various query thresholds that can be utilized for a DBMS 201 that receives 10 queries per second:

TABLE 1

| Time Period | Infrequently Used | Intermittently Used | Frequently Used |
| --- | --- | --- | --- |
| Second | 0-1 | 2-4 | 5-10 |
| Minute | 0-60 | 120-240 | 300-600 |
| Hour | 0-3,600 | 7,200-14,400 | 18,000-36,000 |
| Day | 0-86,400 | 144,000-345,600 | 432,000-864,000 |
| Week | 0-604,800 | 1,008,000-2,419,200 | 3,024,000-6,048,000 |

TABLE 1-continued

In database support, an index is used as an access method to implement a query, as opposed to some other method such as a table scan method that does not use an index to search for records in a database file. Thus, when an index is used to access a query, it is referred herein as an index receiving a query. In an exemplary embodiment, for a query log generated for the queries to a particular index during the past hour, if the index received 1000 queries, it would be categorized as "infrequently used". On the other hand, if the index received 20,000 queries, it would be categorized as "frequently used". The thresholds are dependent on the total number of queries received by the DBMS 201.

In another embodiment, an index can be classified based on queries compared to other indexes. For example, in a scenario where index A receives 0 queries, index B receives 5 queries, and index C receives 40 queries, index A will be classified as "infrequently used", index B will be classified as "intermittently used", and index C will be classified as "frequently used".

The data retrieval analyzer 206 receives the index classification from the query analyzer 204. The data retrieval analyzer 206 performs green optimization estimates to determine if it is more cost and energy efficient to retrieve an index stored on a sleepy drive, or whether to execute an alternative access plan to handle the query.

The data retrieval analyzer 206 determines, for example, the cost to create a temporary index (e.g. when an ad-hoc index must be created on the fly in real-time), the cost to sort using a temporary file rather than an index for ordering, the cost to use hash join processing rather than a nested loop join, the cost to create an "index from index" on an available index, or any other optimization estimates which determine the cost, time, or energy required to satisfy the query.

The data retrieval analyzer 206 can be a pre-programmed functional code, or configurable by the user to include customized optimizer calculations.

Figure 3:
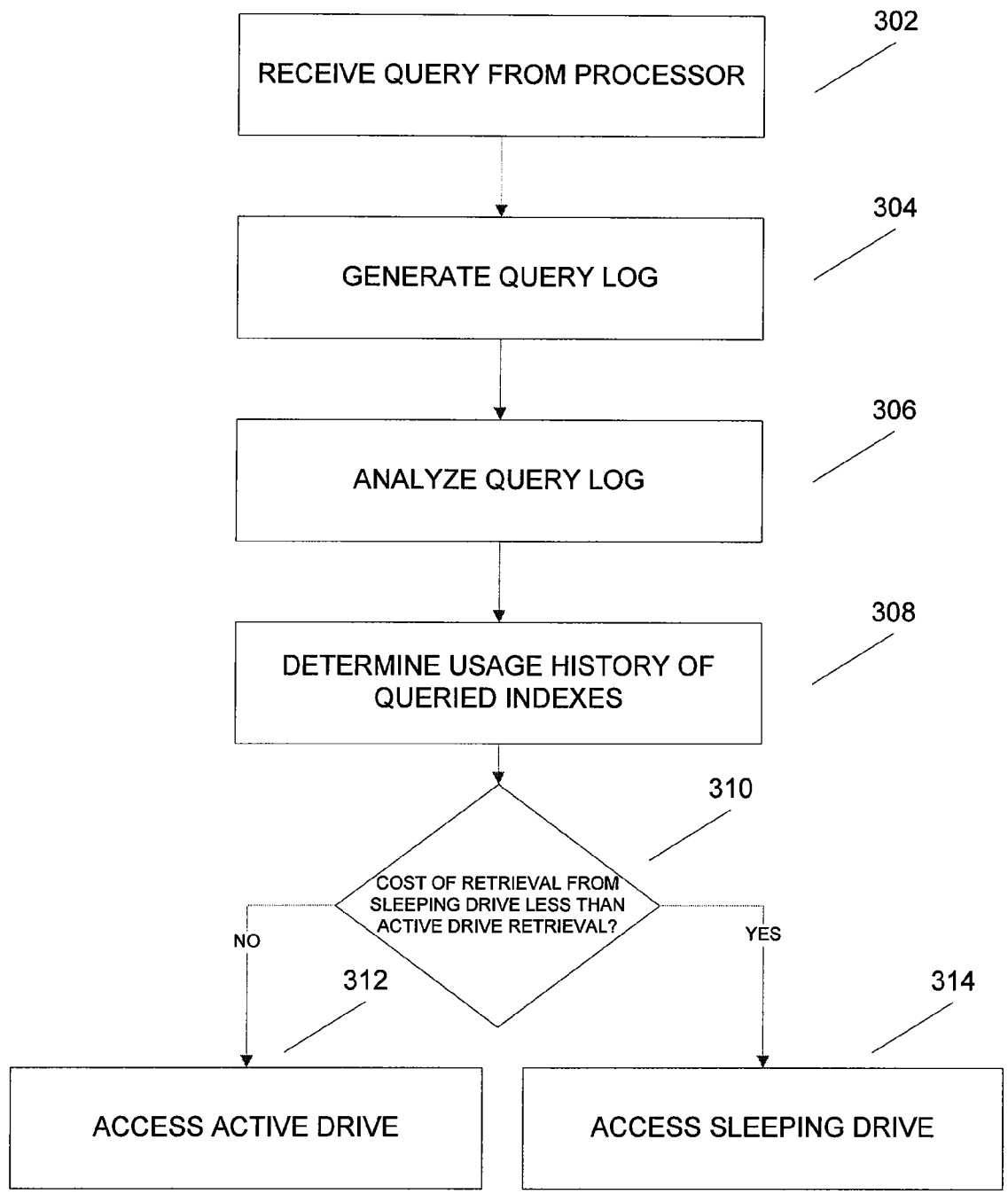
FIG. 3 is a flowchart illustrating disk drive access determination according to an embodiment of the present invention.

FIG. 3 is a flowchart illustrating disk drive access determination according to an embodiment of the present invention. In step 302, the DBMS receives a query from a processor, such as a CPU. In an embodiment, multiple users at multiple CPUs can transmit simultaneous requests to the same DBMS using a query server. The query server connects the DBMS to a network with multiple client machines. In this embodiment, multiple queries are received by the DBMS at step 302.

In another embodiment, a user, such as a database manager or a data analyst, can be directly connected to the DBMS through an interface on a machine hosting the DBMS. In step 304, a query log is generated by a query log generator as discussed above. The DBMS stores a query database, or history of queries, made by users. The query database contains an entry for each query made to the DBMS for each particular index stored on the various disk drives in a database. Each entry identifies the raw natural language and fields, if any, entered by the user to perform the query. The entry also includes the date and time of the query as well as the number of matches that result from the query. In addition, each entry can also include an identification number of the user or CPU, such as internet protocol address or user login, used to access the DBMS.

Next, in step 306, the query log generated in step 304 is analyzed using a query log analyzer as described above to determine a set of index query patterns, or to identify an index or indexes that is being targeted by the query. The query log can be accessed upon a new query or set of queries, or can be accessed periodically by the query log analyzer. The query log analyzer analyzes the query activity that has taken place for a particular index, set of indexes, or entire database. In an embodiment, the query log analyzer can analyze one or more query logs and determine a usage frequency classification for each index. In an embodiment, the query log analyzer is a Perl script or pre-programmed code. Alternatively, the query log analyzer can be programmable and customizable.

In step 308, the query log analyzer determines the usage frequency of the particular index as described above. Frequently, used indexes will be saved to drives that are not identified as sleepy drives, and will typically be available for frequently-run queries. If an index is not required as often or used only during peak hours, it will be saved on a sleepy disk drive. When a query is run that requires an index on a sleepy drive, the DBMS will look at alternate access plans to implement the query (described below).

In step 310, a data retrieval analyzer determines the cost of retrieving data from a sleepy drive versus alternative access plans which may require retrieval from an active drive. Often the run time estimates from the "green optimization estimates" described above will show that the query can be satisfied more efficiently by accessing an active drive versus a sleepy drive. In this case, the DBMS routes the query and executes it against the index stored on the active drive in step 312.

However, in the alternate scenario where the run time estimates show that the query can be satisfied more efficiently by accessing a sleepy drive versus an active drive, the slower access time to wake up the sleepy drive will be accepted and the DBMS routes the query and executes it against the index stored on the sleepy drive in step 314.

In an embodiment, when determining the cost, time, and efficiency estimates, the wakeup time required for the sleepy drive is considered. If the query is long running, for example, one hour or more, then the wakeup time for a sleepy device will be more acceptable.

In another embodiment, if a query to an index stored on a sleepy drive is determined to be run more frequently, the index will be moved to an active drive. Conversely, if an index stored on an active drive does not receive many queries so that it is categorized as "infrequently used", then the index will be moved to a sleepy drive. The decision to transfer an index is based on usage thresholds and statistics based on the query logs and determinations made by the query log analyzer and data retrieval analyzer.

In addition, overhead and time required for transferring an index from a sleepy drive to an active drive will be included in estimates to avoid too frequent movement between active and sleepy drives.

In another embodiment, files, data areas, and other objects in addition to indexes can be monitored and transferred between sleepy drives and active drives as a function of usage thresholds and statistics.

Figure 4:
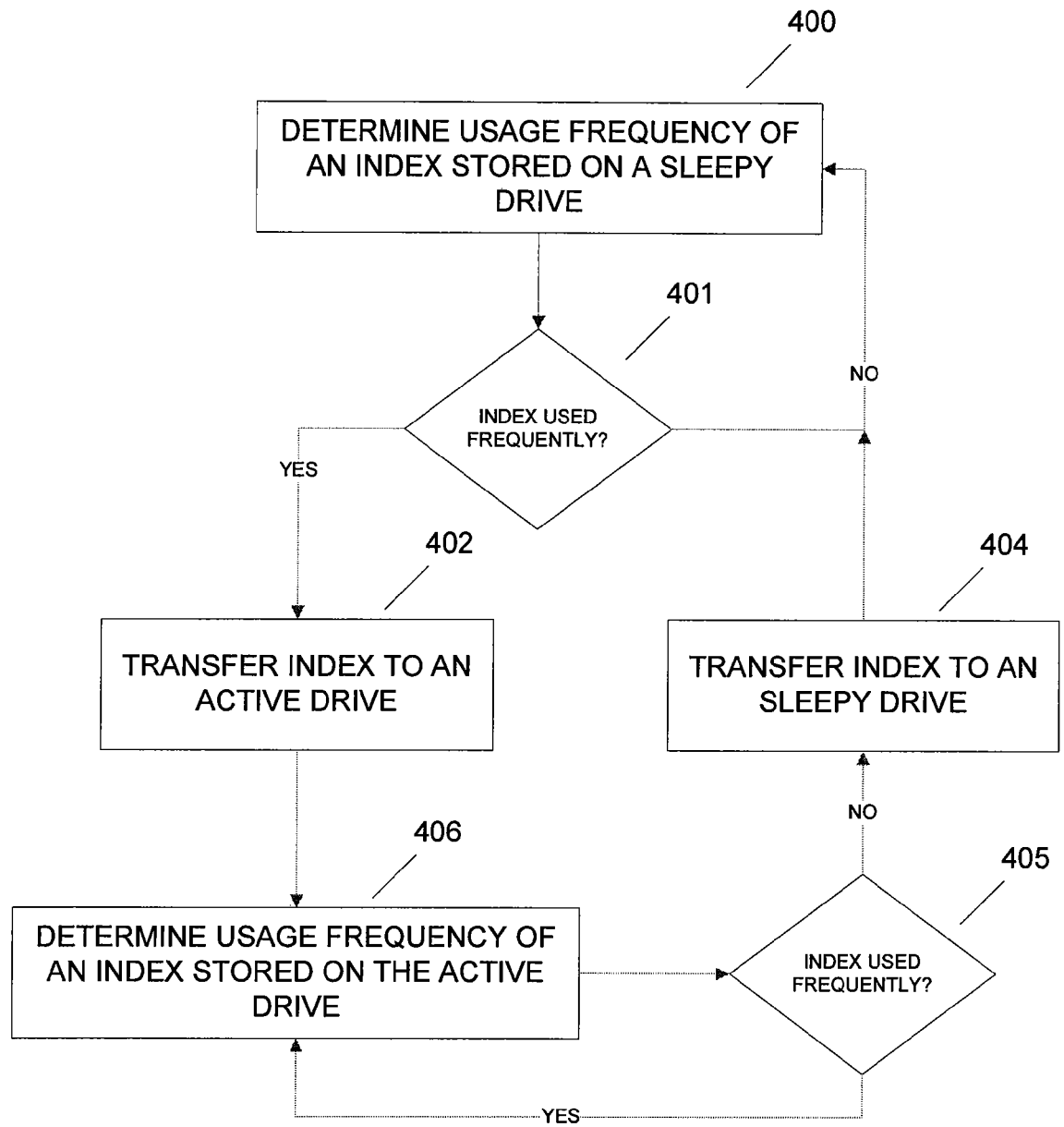
FIG. 4 is a flowchart illustrating optimization of database objects according to an embodiment of the present invention.

FIG. 4 is a flowchart illustrating optimization of database objects according to an embodiment of the present invention. In step 400, a query log analyzer determines the usage frequency of an index stored on a sleepy drive, using query log statistics and various thresholds as described above. If the index is determined to be frequently used in step 401, then in step 402, the index is transferred from the sleepy drive to an active drive. On the other hand, if the index is determined to be infrequently used in step 401, then no action is taken, and the index remains on the sleepy drive. The DBMS then continues to monitor the index back in step 400.

Once an index is transferred to an active drive in step 402, the query log analyzer determines the usage frequency of the index in step 406 as described above. If the index is determined to be frequently used in step 405, then the index is transferred to a sleepy drive in step 404, and the DBMS continues to monitor the index back in step 400. However, if the index is being frequently used in step 405, then no action is taken, and the index is continued to be monitored on the active drive at step 406.

In an embodiment, the DBMS continuously monitors the usage frequency statistics for indexes stored on the sleepy and active drive. The frequency of monitoring and generating these statistics can be user-defined. For example, the DBMS can perform optimization daily, hourly, weekly, monthly, or yearly. In another embodiment, the DBMS can perform optimization upon an event occurring, such as an unusually high number of queries being received.

In another embodiment, a plan cache can log the hits and misses of using both active and sleepy drives. An analyzer task, for example, can then optimize the layout of objects for the next day, week, month, or any other period of time. The optimizer can anticipate when tables will be needed on active drives, and then read from sleepy drives in advance of queries. Thus, the optimizer can have the indexes stored in the RAM beforehand.

For intermittently used objects, such as objects that tend to move to sleepy drives at times, and then back to active drives, the optimizer can migrate a table's column and/or only an index's statistics to an active drive for a quick lookup. Conventionally, this information is stored within the actual table or in a DBMS catalog which requires retrieval and a longer lookup time.

In another embodiment, the invention uses journals as a vehicle for tracking database changes. Thus, a journal can be viewed as a controller module of a journal receiver, which is a table. Detached journal receivers can be placed on sleepy drives, while attached journal receivers can be attached to active drives. When operations (such as SQL insert, update, delete and other native database operations) are applied to database objects, the changes, known as journal entries, on the database objects are sent to the appropriate journal receiver.

In another embodiment, the present invention provides an improved sleepy drive device, in which a query optimizer intelligently selects and controls the speed of the sleepy drive in order to optimize energy savings by a graduated degree based on a speed setting of the sleepy drive.

Figure 5:
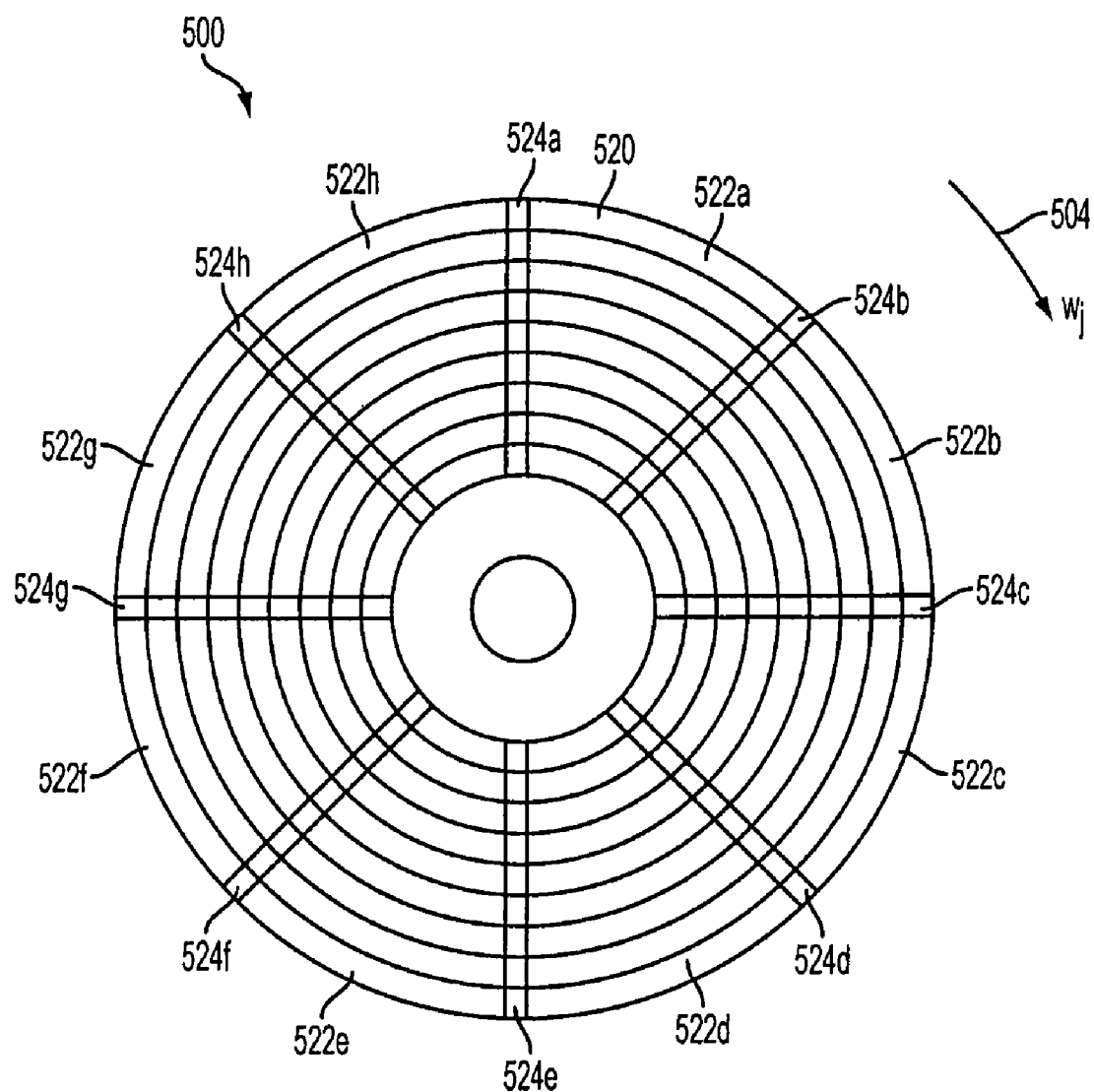
FIG. 5 illustrates the geometry of a disk drive surface as is known in the art.

FIG. 5 illustrates the geometry of a disk drive surface as is known in the art. The disk surface 500 is divided into concentric circular "tracks" on the disk surface. If there are multiple disks, then the vertical alignment of the tracks on the disks aligned in parallel together comprise a cylinder. The outer cylinder or track is shown as reference 520. Each cylinder is further divided into user data sectors 522a-h and prerecorded servo sectors 524a-h. A logical block address ("LBA") is used to address a specific location within the disk stack and is mapped by the disk drive control electronics to a cylinder or track, head number indicating a particular head in a multi-disk system, and sector.

The disk 500 is rotated by a spindle motor at a velocity $\omega_j$ in the direction of arrow 504. The disk may be rotated at two or more discrete velocities $\omega_j$. The particular velocity $\omega_j$ used can be determined on the basis of the disk speed optimization based on, for example, an operating mode, query optimization and query patterns, power consumption, and/or workload considerations.

Figure 6:
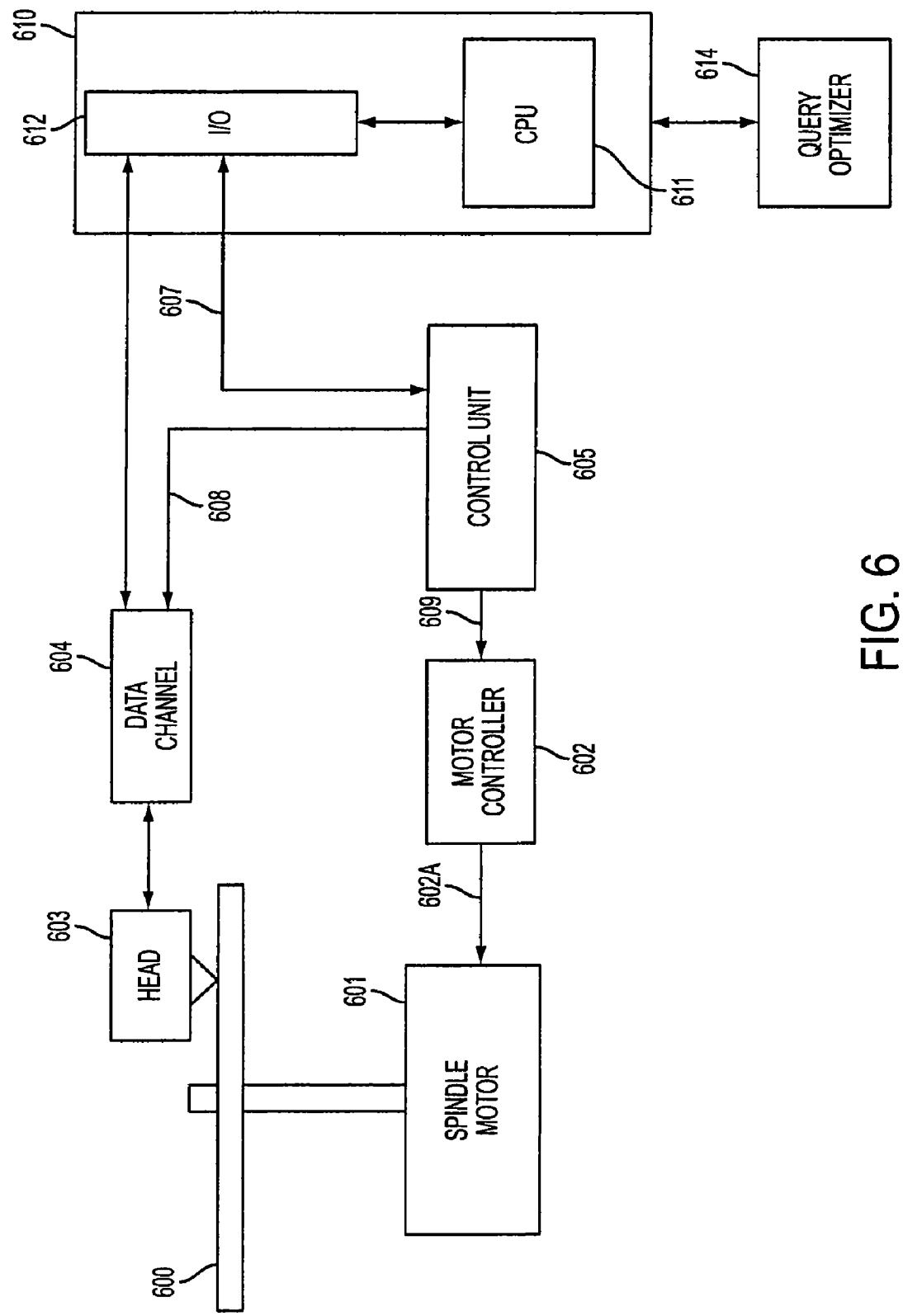
FIG. 6 is a block diagram of an exemplary disk drive capable of controlling spindle velocity.

FIG. 6 is a block diagram of an exemplary disk drive capable of controlling spindle velocity. A disk 600 is rotated by a spindle motor 601. The rotational velocity of the spindle motor 601 is controlled by a motor controller 602. The motor controller 602 provides a control signal 602A to the spindle motor 601 which causes the spindle motor 601, and hence the disk 600, to rotate at selected discrete velocities. A transducer 603, such as a read/write head, is positioned adjacent to the disk 600 to read and/or write information to and from the surface of the disk 600.

The transducer 603 may be mounted to, for example, a rotary actuator (not shown) to position the transducer over a desired track location. The transducer 603 is connected to a data channel 604 which may be used to read and write signals from and to the disk. It is noted that because the disk 600 is rotated at different velocities the data channel 604 must be capable of reading and/or writing data at a number of different frequencies, each corresponding to one of the discrete rotational disk velocities used by the disk drive. In a read operation, for example, the transducer 603 provides a raw signal of information read from the disk to the data channel 604 which extracts data from the signal at the appropriate frequency for the given disk velocity. The data read from the disk 600 is supplied from the data channel 604 to I/O interface 612 which processes the signal for use by the CPU 611 of a computer 610 in which the disk drive is provided.

The control unit 605 may also be coupled to the computer 610 to receive a control signal 607 from the CPU 611. The CPU 611 receives query pattern and optimization information from the query optimizer 614. The query optimizer 614 can have a query log generator, query analyzer and a data retrieval analyzer similar to those described above in FIG. 2. The control unit 605 may also be coupled to the data channel 604 via signal 608, and the control unit 605 may be coupled to the motor controller 602 via signal 609.

Using the condition control signal 607, the control unit 605 provides a velocity control signal 609 to the motor controller 602 to specify a disk velocity. As noted above, the control signal 607 informs the control unit 605 of speed change based on output from the query optimizer 614.

The query optimizer 614 can speed up and slow down the spindle motor 601, depending on, for example, drive workload and performance considerations. In another embodiment, the query optimizer 614 is networked to multiple drives and uses network workload and performance considerations, which take into account multiple individual drive workloads, to determine optimization information.

The query optimizer 614 can control the speed of the spindle motor 601 during daily processing tasks as a way to conserve energy and reduce the amount of heat generated from the disk drive. For example, a 7,200 revolutions per minute (RPM) disk drive would be slowed down to an RPM that would meet performance expectations.

Table 2 below shows exemplary states that a 7,200 RPM disk drive can have based on the query optimizer 614:

TABLE 2

| State | RPM | Speed (%) |
|---|---|---|
| 1 | 7,200 RPM | 100% |
| 2 | 5,400 RPM | 75% |

TABLE 2-continued

| State | RPM | Speed (%) |
|---|---|---|
| 3 | 3,600 RPM | 50% |
| 4 | 1,800 RPM | 25% |
| 5 | Shut Down (0 RPM) | Shut Down (0 %) |

In an embodiment, the query optimizer 614 can determine the degree of I/O constraint and CPU constraint for a given query or group of queries, and can determine an optimal disk speed in order to reach a balance between I/O constrained and CPU constrained queries. In this way, choosing an optimal lower speed for a sleepy drive will not affect performance of the drive as long as the query is CPU constrained.

I/O constrained queries are queries that have to wait for the information on the disk to complete before processing of the query can continue. In contrast, an example of a CPU constrained query is a query that has many comparisons or mathematical type processing and does not require much I/O to complete the query.

The query optimizer 614 can look at the queries running to determine if they are running I/O constrained or CPU constrained. If the workload is CPU constrained, then the optimizer can tell some or all of the drives to move to a slower speed, such as for example, a percentage reduction of speed based on how CPU constrained the system is running. If the query workload is mainly I/O constrained, the query optimizer 614 will tell the system to move some or all of the drives up to a faster state. This allows for lag times or other constraints to complete before a speed adjustment is made. By processing system workloads in this manner, the query optimizer 614 can recognize if the system has a slow workload (i.e., no or low I/O), and can slow down, or eventually shut down, some or all of the drives if not being used.

The query optimizer 614 can adjust the speeds of some drives to make them run at 100% speed while making others run at a lower speed. It can speed up those drives that have high availability files, or assign high availability files and indexes to the faster drives.

The query optimizer 614 can take advantage of the iSeries Predictive Query Governor™ (not shown), or any other query governor to stop the initiation of a query if the estimated or predicted run time (i.e., elapsed execution time) for the query is excessive, to determine how long a query will run based on current disk drive speeds. The query optimizer 614 can then make the necessary adjustments to avoid time-outs or failures that may occur if the drive speed or delay is not acceptable.

In another embodiment, the impact of starting up drives can be reduced by having the query optimizer 614 in parallel speed up all of the drives that will be used in a query at the onset of the query. Alternatively, the query optimizer 614 can speed up only the most frequently used drives for a query based on past query patterns stored in query logs as described above. Similarly, the query optimizer 614 can also slow down drives which are not frequently used for a query based on past query patterns.

In another embodiment, the query optimizer 614 can learn and predict when a particular query or group of queries runs, based on past query patterns. For example, the query optimizer 614 can predict that a query will occur every day at 8:00 PM EST, at the very last day of each month, or after a recognized pattern of previous queries. The query optimizer 614 can then speed up the drives several seconds before this known group of queries is predicted to run. Furthermore, the query optimizer 614 can slow down or completely stop a drive if the drive is not predicted to be accessed in the near future.

In yet another embodiment, the user can set a desired level of power savings or an efficiency level to be achieved. The user can pre-set a power savings level, and the query optimizer 614 can attempt to meet this desired level by adjusting drive speed accordingly at potential times where there may be a potential performance degradation. The performance and power savings level can be monitored by the query optimizer 614 and these values can be incorporated into the query optimization procedures described above.

In another embodiment, the query optimizer 614 can control when the read-write heads are unloaded from disks inside a disk drive. In this embodiment, the disk drives do not actually slow down. However, with less drag from the read-write heads, the disk drive may consume less power. In a preferred embodiment, the disk drive consumes 15% to 20% less power.

Alternatively, the read-write head query optimized control may be used in conjunction with the disk drive speed controller by query optimization and/or in conjunction with the sleepy and active drive index access based on query optimization as describe above.

Figure 7:
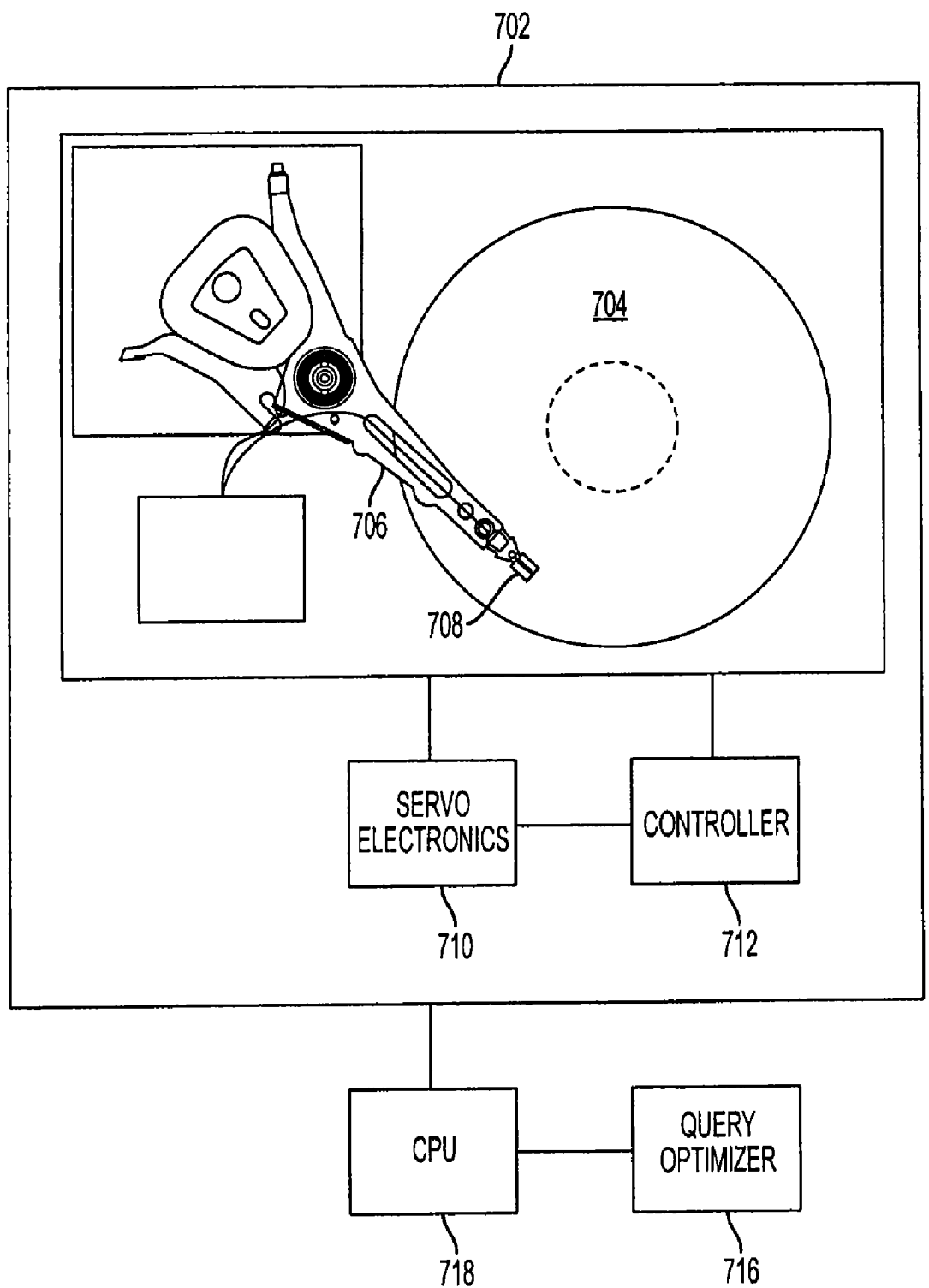
FIG. 7 illustrates a disk drive system in accordance with an embodiment of the present invention.

FIG. 7 illustrates a disk drive system in accordance with an embodiment of the present invention. The disk drive 702 includes one or more rotating disks 704, an actuator assembly 706 to move a head 708 across the disk 704 surface. The disk drive 702 further includes servo electronics 710 and a controller 712 located within the disk drive 702 assembly. In a preferred embodiment, the head 708 is a magnetoresistive (MR) head device. However, in alternative embodiments, the head 708 may be constructed of other materials known in the art. The servo electronics 710 provides a closed loop feedback system to ensure that data heads follow the tracks accurately and to control smooth transitions when the data head "seeks" from one track location to another track. The controller 712 manages read/write operations and controls other disk operations.

In preferred embodiments, the query optimizer 716 sends a control signal (not shown) to the CPU 718, which in turn instructs the controller 712 to position the head 708 accordingly. The query optimizer 716 uses the same intelligence as described above to determine when to intelligently unload the head 708 from the disk 704 based on computed differences in performance compared to query optimization goals.

In an embodiment, the query optimizer 716 can intelligently modify a percentage of a drive speed concurrent with intelligently uploading read-write heads independently of sleepy drives or speeds of sleepy drives.

While the principles of the disclosure have been illustrated in relation to the exemplary embodiments shown herein, the principles of the disclosure are not limited thereto and include any modification, variation or permutation thereof.

What is claimed is:

1. A method of reducing the power consumption of a computer device, comprising:
    receiving a plurality of queries from a processor, each query directed to an index stored on one of an active drive or a sleeping drive;
    generating a log storing a history of the plurality of queries to the index;
    determining, using the log, if the index is infrequently used, frequently used, or intermittently used;
    transferring the index from the sleeping drive to the active drive when the index is frequently used;
    transferring the index from the active drive to the sleeping drive when the index is infrequently used;
    determining a future query request based on the log; and
    temporarily transferring, in anticipating of the future query request, the index from the sleeping drive to an active drive;
    wherein the index provides rapid access to data identified by the plurality of queries, the data stored in one of the active or sleeping drives and wherein the index points to a storage location for the data.

* * * * *